United States Patent [19]

Quint et al.

[11] 4,369,363

[45] Jan. 18, 1983

[54] OPTICAL PULSE DETECTOR AND ENCODER

[75] Inventors: David Quint, Fort Collins, Colo.; George W. Pratt, Jr., Wayland, Mass.

[73] Assignee: Massachusetts Institute of Technology, Cambridge, Mass.

[21] Appl. No.: 244,417

[22] Filed: Mar. 16, 1981

[51] Int. Cl.³ .......................................... H01J 110/14
[52] U.S. Cl. ................................. 250/211 R; 307/427
[58] Field of Search ..................... 250/211 R; 307/427

[56] References Cited

U.S. PATENT DOCUMENTS 4,303,840 12/1981 Bjorkholm et al. ................. 307/427

Primary Examiner—David C. Nelms
Assistant Examiner—Darwin R. Hostetter
Attorney, Agent, or Firm—Arthur A. Smith, Jr.; Thomas J. Engellenner

[57] ABSTRACT

Solid-state waveguide structures are disclosed to detect and/or encode very fast (picosecond) optical signals. The waveguides are appropriately configured to cause very fast signals to interact with interrogation or erasure pulses by a two photon absorption mechanism. The coincidence of the pulses in particular regions causes erasure and/or changes in the waveguide conductivity which can be measured conventionally by parallel circuitry.

4 Claims, 5 Drawing Figures

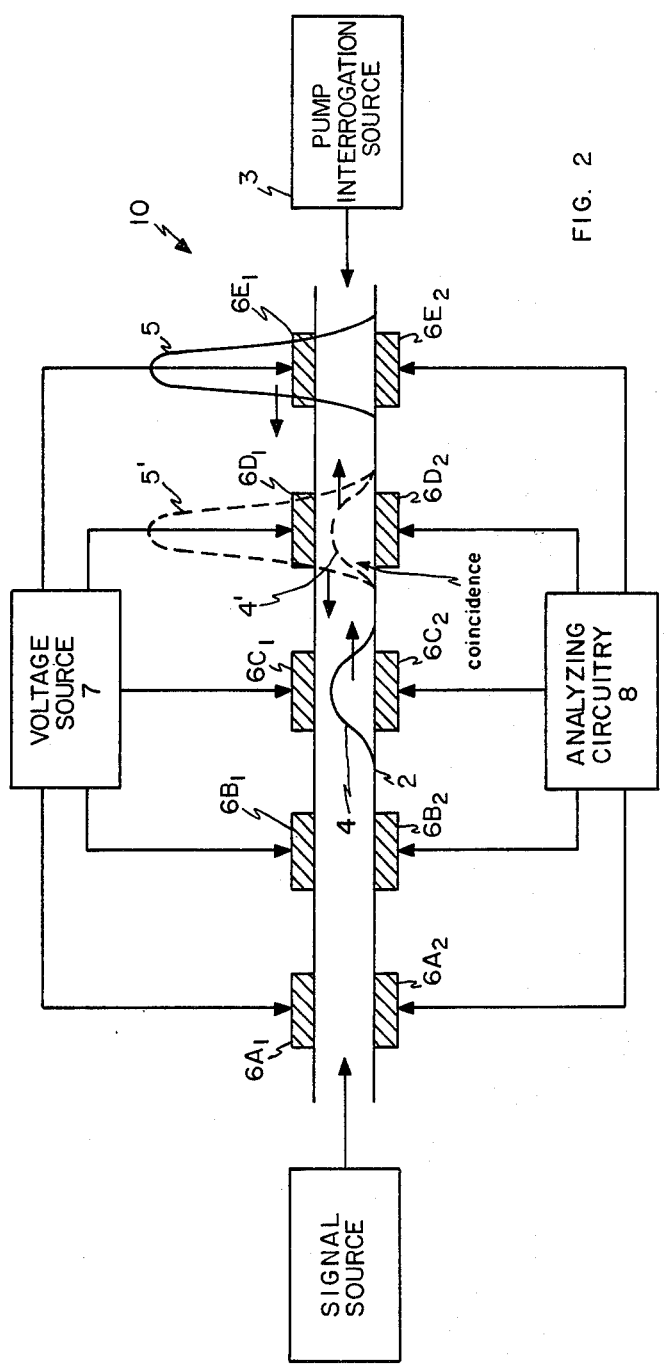
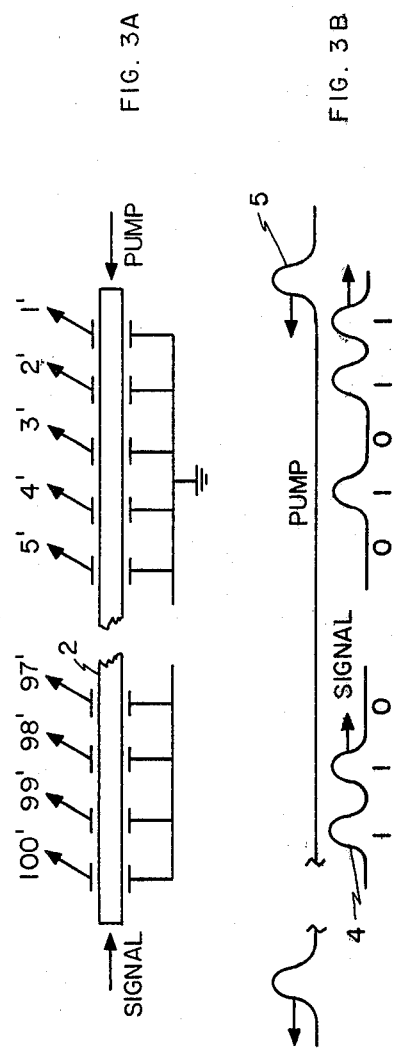
FIG. 2
FIG. 3A
FIG. 3B

OPTICAL PULSE DETECTOR AND ENCODER

BACKGROUND OF THE INVENTION

The Government has rights in this invention pursuant to Grant Numbers DMR 78-24185 and IPA-0010 awarded by the National Science Foundation and M.I.T. Sub-Contract Number E-21-A44, under Prime Navy Contract Number N61339-75-C-0122 awarded to the Georgia Institute of Technology.

This invention relates to optical systems for signal processing.

Optical fibers make possible the transmission of data at extremely high data rates. At present a 270-megabit per second system is in commercial operation with laboratory systems functioning in the 1-gigabit regime. The theoretical bandwidth of optical fibers is very large with theoretical data rates in excess of $10^{11}$ bits per second being possible. However, at such a high rate there has been no practical detectors nor the circuitry to manipulate such signals. Recent advances have produced pulse trains whose elemental pulses are in the ten picosecond (ps) range. Having achieved such pulse trains, it is then necessary to eliminate pulses at given positions along the pulse train in order to encode a message. At these speeds electronic equipment cannot be relied upon to encode.

Much work on the convolution of picosecond pulses has focused on the technique of second harmonic generation ("SHG") to encode pulse trains. In SHG systems two optical signals are coupled in a waveguide structure after one signal has been converted into an antisymmetric mode. By proper phase matching, one produces a strong second harmonic if, and only if, a pulse is present in each arm of the waveguide. SHG requires the extra complications of mode converters and phase matching.

Furthermore, the second harmonic detection technique produces a encoded signal proportional to the square of the intensity of the signal pulses in the pulse train.

Moreover, pulses, once encoded, must be decoded. A detector that could read the pulses serially would have to recover in less than $10^{-11}$ seconds in order to be ready for the next pulse. A detector with such high speed is necessarily very insensitive. Since each pulse typically is made up of about 5000 photons, the response of such a fast detector would be very small. Electronic circuitry to handle signals at this rate does not exist.

Therefore, there exists a need in the art for simple devices capable of encoding and decoding optical pulse trains on the order of 10 picoseconds in duration. In this context, the direct encoding of a light wave by the action of another light wave would be an extremely useful process. If the device which accomplished this task were small, fast, and simple enough, it could form a key element in an all-optical circuit. Likewise a detector which could convert picosecond optic pulses into signals which could be processed electronical would also be a key element in an optical transmission system.

SUMMARY OF THE INVENTION

A new method of detecting, and encoding optical pulse trains based on two photon absorption is disclosed. To exploit very short duration pulses trains, they are broken down into a multitude of channels and caused to interact with a second optical signal which may be generated by more conventional sources. For example, a 100 gigabit pulse train can be broken down into a 100 channels each interacting with a 1 gigabit pump source to encode or decode the train. The two photon absorption mechanism permits the detection of the coincidence of two laser pulses, producing a photocurrent in a semiconductor detector when the two pulses enter the detector at the same time. Thus, by sending properly timed pump pulses—acting as interrogation pulses—into a multichanneled detector, electronic signal are generated at reasonable data rates. Similarly, the coincidence of a pump pulse and a signal pulse in a semiconductor encoder can "erase" the signal pulse. Thus, this same process can be used to encode a train of signal pulses. By sending in pump pulses—now acting as erasure pulses—on a parallel set of channels, a serial, encoded bit stream can be constructed.

Two photon absorption depends upon the relative intensities of the two laser beams, which will be referred to as the pump at frequency $\omega_1$ and the signal at $\omega_2$, and upon their photon energies relative to the energy gap of the semiconductor, Eg. The pump beam acts as a reference signal. The pump photon energy is less than half the energy gap of the material, so that the pump itself produces no electron-hole pairs by two photon absorption, even at high intensities near the damage threshold of the semiconductor material.

The second laser beam, the signal, has a sufficiently large photon energy so that $\hbar\omega_1 + \hbar\omega_2 > E_g$, but $\hbar\omega_2 < E_g$. This signal beam can then generate electron-hole pairs by combination with the pump beam or by direct two-photon absorption of two signal photons. Carrier generation and recombination can be described by the equation $$\partial N/\partial t = B_{12}I_1I_2 + B_{22}I_2I_2 - N/\tau \tag{1}$$

where $I_1$ is the pump intensity, $I_2$ is the signal intensity, $B_{12}$ and $B_{22}$ are the two photon absorption coefficients. The carrier pairs recombine with a time constant $\tau$. If the signal beam is now made two or three orders of magnitude lower in intensity than the pump beam ($I_2 << I_1$), the second term on the right of Eq. (1) becomes unimportant, since $B_{12}$ will be approximately equal to $B_{22}$.

$$\partial N/\partial t = B_{12}I_1I_2 - N/\tau \tag{2}$$

The generated carriers can now be detected by the change in conductivity of the material while the excess carriers are present or the process can be used to erase the signal pulse whenever it coincides with the pump pulse.

For purposes of illustration the invention will be described in connection with certain preferred embodiments. It should be recognized by those skilled in the art that various changes and modifications of the detector and encoder, as they are described and illustrated, can be made without departing from the spirit or scope of the invention.

BRIEF DESCRIPTION OF THE DRAWINGS

FIGS. 2, 3a and 3b show schematic diagrams of a detector.

DESCRIPTION OF THE PREFERRED EMBODIMENT

Figure 1:
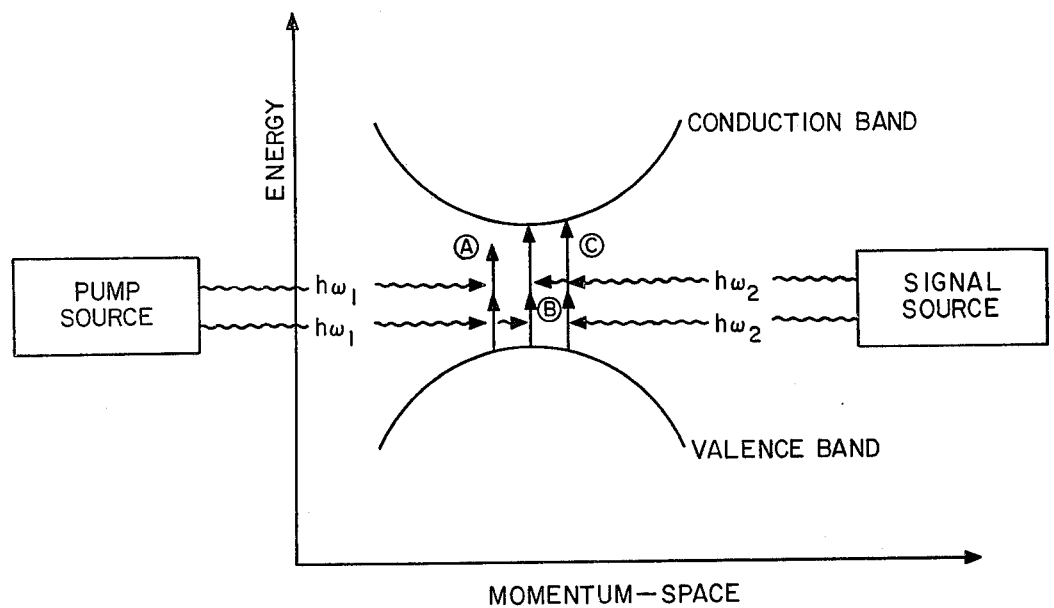
FIG. 1 shows energy band structure.

In FIG. 1 the energy band structure for a typical semiconductor is shown to illustrate the two photon absorption process. In the invention detection and erasure are both achieved by the absorption of a pair of photons by the semiconductor and the consequent excitation of electrons across the energy gap from a valence band into a conduction band. As can be seem at point "A" the combined absorption of energy of two pump photons is insufficient to excite an electron across the gap. However, the combination of two signal photons, as shown at point "C", or, most importantly, the combinations of a signal photon and a pump photon, as shown at point "B", excites the semiconductor. The operability of this process has been demonstrated using a Tellurium semiconductor and a 10.6μ or 0.117 eV carbon dioxide laser as the pump source with a 5.3μ or 0.234 eV carbon monoxide laser as the signal source. The energy gap in the Tellurium crystal was 0.333 eV and the crystal was transparent to both the $CO_2$ and CO radiation, in the absence of two photon absorption. The significance of two signal photons being absorbed was greatly reduced by making the pump source much more (i.e. 1000 times more) intense than the signal source. Erasures of over 50 percent of the signal pulse by two-photon absorption were observed. Although these results are reported for Tellurium, similar results can be expected for other semiconductor systems such as Gallium-Aluminum Arsenide with appropriate pump and signal sources.

In FIGS. 2 and 3 schematic diagrams of a detector 10 are presented.

A signal pulse train 4 containing coded information is coupled to a waveguide 2 from the left. An interrogation pulse 5 is coupled at 3 into the guide 2 from the right. The signal pulse train 4 comes from a source which may be a picosecond pulse generator, coded in the manner described below, for example. The pulse 5 passes into and through the pulse train 4 entering from the left. Every time a coincidence between a signal pulse of the pulse train 4 and the interrogation pulse 5 occurs (see pulse 5' and pulse 4' in FIG. 2) two photon absorption ("TPA") generates a local change in conductivity with a substantial portion of the signal pulse being absorbed by the TPA process. An array of electrode pairs $6A_1$-$6A_2$ ... $6N_1$-$6N_2$ are spaced along the guide 2 and adapted to measure a local change in carrier density, acting as avalanche photodetectors. The longitudinal spacing between each pair of electrodes (i.e. between 6A and 6B may be of the order of one millimeter and the width of the guide (i.e., the spacing between the electrode $6A_1$ and the electrode $6A_2$) is of the order of one micrometer. Consequently cross talk between neighboring electrode pairs will be very small. An interrogation pulse may be sent every $10^{-9}$ seconds. This will be able to sample 100 pulses of 10 ps width. Hence a 100-gigabit rate data stream is transformed into 100 1-gigabit data lines. The signal-to-noise ratio should be of the order of ten to one.

The waveguide 2 in FIG. 2 preferably is an integrated optical waveguide (e.g., GaAlAs diffused into GAAs substrate) and the electrodes $6A_1$ ... are metal patterns deposited therein by well-known techniques. Coincidence of two laser pulses (e.g., the pulses 4' and 5' in FIG. 2) produces a photocurrent in the semiconductor material of which the guide 2 is formed; that photocurrent changes the conductance in the guide 2 by an avalanche effect and that change in conductance is sensed. Sensing is effect by passing an electric current between a voltage source 7 and analyzing circuitry 8 and noting changes in that current.

A use for the two-photon detector 101 is shown in FIGS. 3A and 3B. The signal pulse is introduced into the waveguide 2 which has an array of electrodes, as in FIG. 2, in electrical contact with the waveguide material. These form avalanche photodetectors which sense changes of conductivity within their respective sections or regions of guide 2. The signal consists of a string of time-division multiplexed binary signals at a pulse repetition rate of 100 gbit/s. The pump signal 5 is the output of a mode-locked laser, pulse width 10 psec at a pulse repetition rate of 1 Gbit/s. The pump pulse 5 interrogates the signal bit stream 4 by causing free carrier generation at position 1', then position 2', etc. depending on the relative position in time of the signal 4 and the pump pulse 5. The result of this process is the demultiplexing of a 100 Gbit/s pulse stream into 100-1 Gbit/s pulse streams in a device approximately five centimeters long. The recombination time of the free carriers within the guide 2 need only be about 1 nanoseconds. This device is by no means the only type of structure that can be built. The same physical process could be used at nearly any wavelength and pulse width and could serve a variety of purposes.

Figure 4:
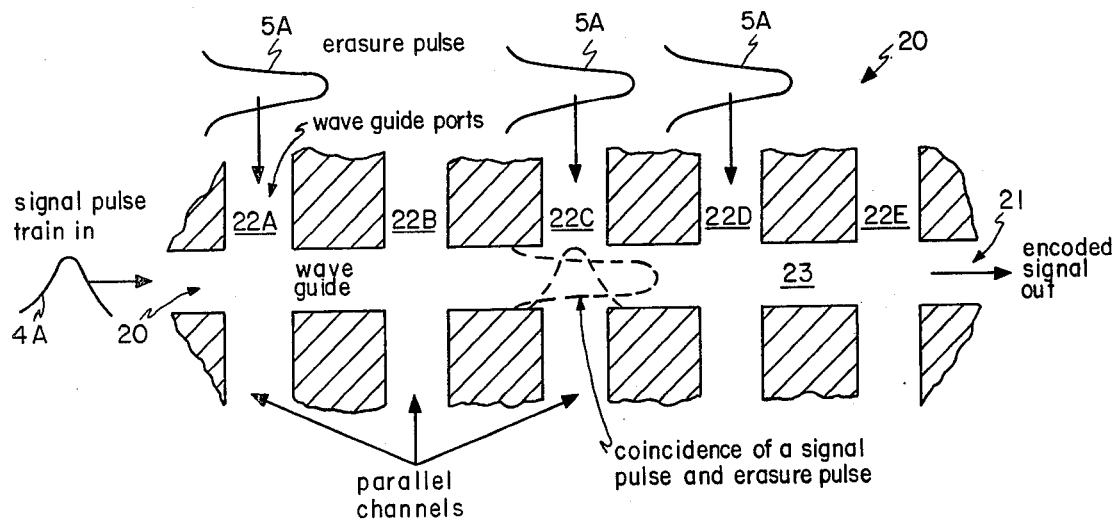
FIG. 4 shows a schematic diagram of an encoder.

In FIG. 4 a schematic diagram of an encoder 20 is presented. A pulse train of signal pulses on the order of 10 picoseconds in duration are coupled to waveguide 23 from the left. Pulse 4A represents a pulse train of equally-spaced pulses and the erasure pulses are labeled 5A. A waveguide 23 (which may be made of the same material as the detector waveguide 2 described above) has an input port 20 to receive the uncoded pulse train 4A and an output port 21 at which the encoded pulse train exits. The guide 23 includes a number (e.g., one hundred) waveguide ports 22A, 22B ... oriented at an angle (here 90°) to the signal pulse path. Whenever there is spatial and temporal coincidence of a pulse 4A and a pulse 5A (e.g., at the intersection of the port 22C and the signal path in FIG. 4), the pulse 4A is partially or completely erased. The absorbtion creates carriers, as before, which can be detected by electrodes at each coincidence site to confirm erasure. An important simplifying extension of the encoding scheme is to use a cw signal in place of the signal pulse train 4A; the erasure pulses would then encode the cw signal by depleting the photon density at each coincidence.

What is claimed is:

1. A solid-state two-photon picosecond pulse coincidence detector that comprises:
   a solid-state optical waveguide;
   electrode means adapted to pick up local changes in resistance within said waveguide;
   sensing circuitry means connected to the electrode means and operable to determine the level of conductivity at the site of the electrode means;
   a source of optical signal pulses positioned to direct said optical signal pulses along the optical waveguide;
   a source of optical interrogation pulses positioned to direct optical interrogation pulses along the optical waveguide;
   the material forming the waveguide and the frequencies of both the optical signal pulses and the optical interrogation pulses being matched or interrelated so that both the optical signal pulses and the optical interrogation pulses propagate along the waveguide with minimal propagation losses; and means to synchronize an optical interrogation pulse with individual pulses of a train of the optical signal pulses to establish spatial and temporal coincidence of the optical interrogation pulse and the optical signal pulses;

the photon energy of the optical interrogation pulse being less than one-half of the minimum carrier-producing electronic transistion in the waveguide, the photon energy of each optical signal pulse being less than the energy of said electronic transitions but greater than the difference in energy between said electronic transitions and the photon energy of the optical interrogation pulse, and the material forming the waveguide being further adapted to permit carrier generation when there is spatial and temporal coincidence of an optical signal pulse and the optical interrogation pulse, which carrier generation results in an electric current through the electric means, which electric current is noted by the sensing circuitry means.

2. A solid-state two-photon encoding device that comprises a solid-state optical waveguide structure, means configured to receive a train of optical signals and optical erasure pulses at spaced regions along the waveguide structure means and to effect two-photon absorption of photons from both an optical signal and an optical erasure pulse at a region of said spaced regions whenever temporal coincidence exists between the optical signal and the optical erasure pulse at said region; means to introduce the optical train of signals to the waveguide structure means; and means to introduce the optical erasure pulses at said spaced regions.

3. A solid-state two-photon device that comprises a solid-state optical waveguide structure, means directing an optical signal into the waveguide structure, means directing optical pulses into the waveguide structure in a way that effects spatial and temporal coincidence of the optical signal and optical pulses at spaced regions along the waveguide to induce the absorption of photons from the optical signal by a temporally coincident optical pulse by virtue of two-photon absorption at each of the spaced regions in a predetermined pattern.

4. A solid-state two-photon device that comprises:

a solid-state optical waveguide structure, means to direct an optical signal along the waveguide structure in a first direction, and a source of optical pulses, which source directs said optical pulses into the optical waveguide in a second direction to predetermined spaced regions along the waveguide structure, which optical pulses serve to induce the absorption of photons from the optical signal by virtue of two-photon absorption when there is a spatial and temporal coincidence at a predetermined region of the optical signal and an optical pulse.

* * * * *